(12) United States Patent
Laird

(10) Patent No.: US 6,871,161 B2
(45) Date of Patent: Mar. 22, 2005

(54) PREDICTING PERFORMANCE OF A SET OF VIDEO PROCESSING DEVICES

(75) Inventor: Michael Laird, Nashua, NH (US)

(73) Assignee: Avid Technology, Inc., Tewksbury, MA (US)

( * ) Notice: Subject to any disclaimer, the term of this patent is extended or adjusted under 35 U.S.C. 154(b) by 81 days.

(21) Appl. No.: 10/407,050

(22) Filed: Apr. 4, 2003

(65) Prior Publication Data

US 2004/0199359 A1 Oct. 7, 2004

(51) Int. Cl.⁷ .............................................. G06F 19/00
(52) U.S. Cl. ........................ 702/182; 702/178; 725/80
(58) Field of Search .............................. 702/176, 193, 702/178–183, 186, 187, 189; 348/97, 180, 184, 185, 411.1, 412.1, 415.1, 552, 584, 548; 386/52, 83, 88, 92, 100, 102; 725/48, 80; 714/47, 57; 703/13, 19–22; 375/240.01

(56) References Cited

U.S. PATENT DOCUMENTS 5,602,684 A * 2/1997 Corbitt et al. ................ 386/52
6,041,286 A * 3/2000 White ......................... 702/176
6,173,422 B1 * 1/2001 Kimura et al. ................ 714/57

* cited by examiner

Primary Examiner—Hal Wachsman
(74) Attorney, Agent, or Firm—Peter J. Gordon

(57) ABSTRACT

Performance of a set of video processing devices in a flexible architecture can be predicted by analyzing and storing information about the performance of individual video processing devices. A combination of operations to be performed is associated with a set of video processing devices. Performance characteristics of individual video processing devices in the set are accessed. For each frame, a total performance characteristic of the set of video processing devices is determined by combining the performance characteristics of the individual video processing devices according to a combination of operations performed by the set of video processing devices to produce data for each frame. The performance characteristic may include latency, processing time and/or memory bandwidth. The total performance characteristic may be compared to a threshold. According to this comparison, it can be determined whether the set of video processing devices can produce each frame in real time.

10 Claims, 2 Drawing Sheets

PREDICTING PERFORMANCE OF A SET OF VIDEO PROCESSING DEVICES

BACKGROUND

Video processing systems used for editing video generally provide a set of effects and other operations that may be combined in various ways to create a video program. Due to the wide variety of combinations of operations that might arise during editing, most video processing systems have a limit to the combinations of operations that can be performed in real time. If the architecture of the video processing system is fixed and well-known, then this limit can be easily defined. In systems with flexible architectures, such as those with flexible hardware architectures or those that combine software and hardware-based processing, it can be difficult to characterize performance of the system, and thus to determine whether a set of operations can be performed in real time.

SUMMARY

Performance of a set of video processing devices in a flexible architecture such as flexible hardware, software or both, can be predicted by analyzing and storing information about the performance of individual video processing devices. An editor specifies a combination of operations to be performed, which are associated with a set of video processing devices. Given this set of video processing devices to be used, the performance characteristics of individual video processing devices in the set are accessed. For each frame, a total performance characteristic of the set of video processing devices is determined. This determination can be made by combining the performance characteristics of the individual video processing devices according to a combination of operations performed by the set of video processing devices to produce data for each frame. The performance characteristics may include latency, processing time, bus bandwidth, and/or memory bandwidth. The total performance characteristic may be compared to a threshold. Based on this comparison, it can be determined whether the set of video processing devices can produce each frame in real time.

Accordingly, in one aspect, a method and computer program product is provided for predicting performance of a set of video processing devices. For each frame, a total performance characteristic of the set of video processing devices is determined. This performance characteristic is determined by accessing a model of performance characteristics of individual video processing devices in the set of video processing devices. The performance characteristics of the individual video processing devices are combined according to a combination of operations performed by the set of video processing devices to produce data for the frame.

DETAILED DESCRIPTION

In the following description, an example of performance prediction is provided in the context of video processing devices that perform special effects operations. The invention is applicable to video processing devices that perform other operations or combinations of operations, for example but not limited to, any operation that modifies the image rate, image size or image contents of video data, including but not limited to color effects, color correction, paint operations, transitions, chroma keys, luma keys, compositing and pan and scan operations, and any operation that changes the form or location of video data, including but not limited to an encoder or decoder, a network interfaces, or a file system. A video processing device may be a hardware-implemented device or software executed on a general purpose computer, or a combination of both.

Figure 1:
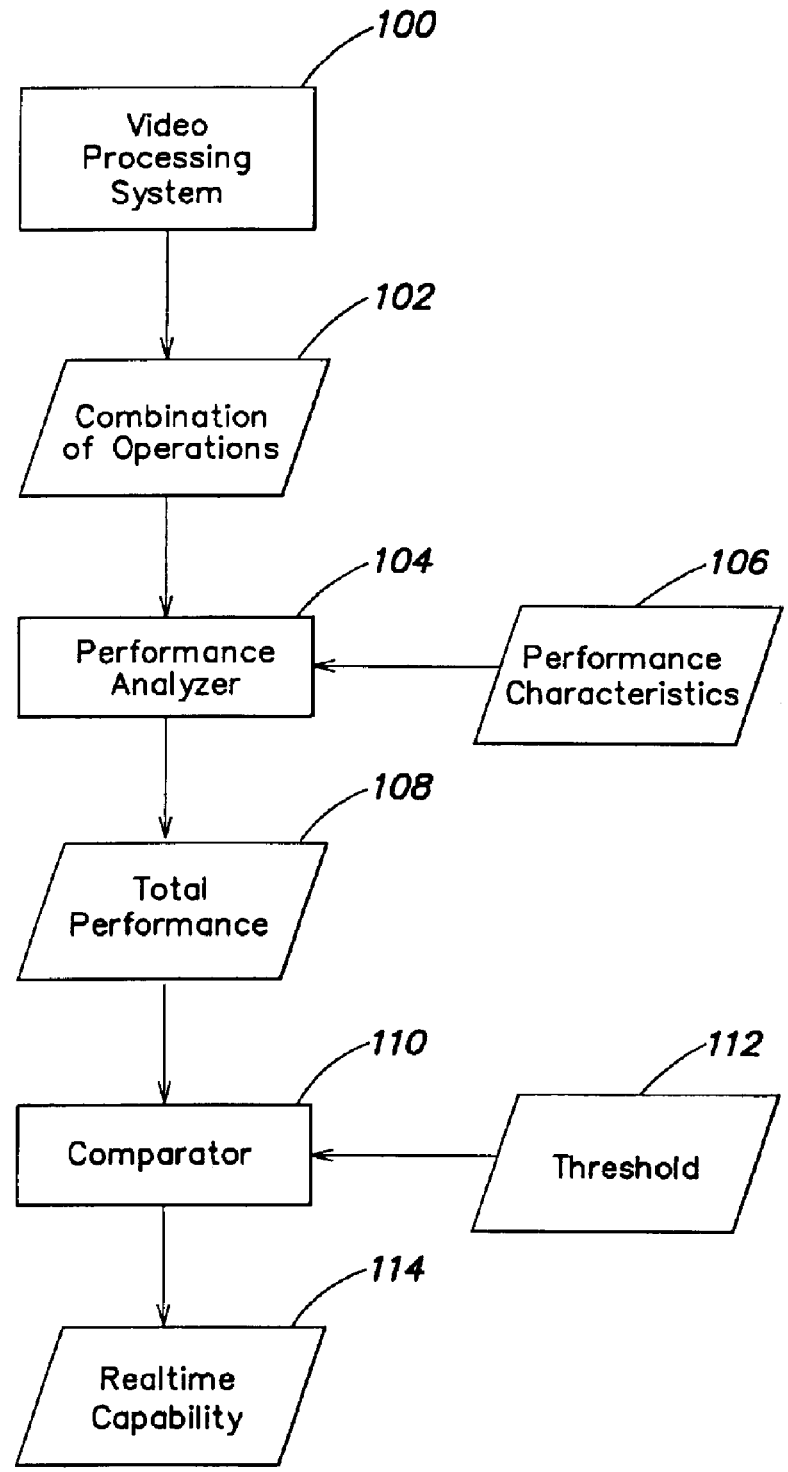
FIG. 1 is a data flow diagram of an example video processing system that predicts performance of a set of video processing devices.

Referring now to FIG. 1, a video processing system 100 allows a user to specify a combination of operations 102 on video data using a set of video processing devices. A combination of operations generally may be represented by a directed acyclic graph. In particular, video data is input to one or more operations. The outputs of these operations may be applied to inputs of one or more other operations, until a final output image is produced for each desired output time.

Each operation in a combination of operations 102 is associated with a video processing device. Each video processing device has a model of its performance characteristics 106 associated with it. How such performance models may be determined is described in more detail below. Given the specified combination of operations, a performance analyzer 104 determines the total performance characteristic 108 of the set of video processing operations used to perform the combination of operations, for each output image. This total performance characteristic may be compared to a threshold 112 by a comparator 110 to provide an indication of the realtime capability 114 of the set of video processing devices to perform the combination of operations.

Example performance characteristics of a video processing device that may be maintained in the performance model include, but are not limited to, its latency, its processing speed and its memory bandwidth. Latency of a video processing device means the amount of time, or delay, between the input of the first pixel of input image data and the output of the corresponding pixel in the image data that is output from the device. Processing speed of a video processing device is the amount of time between the output of the first pixel of an output image data from the video processing device and the output of the last pixel of the output image data. Memory bandwidth is the proportion of the total memory bus bandwidth used to transfer each input image to the video processing device from memory, and/or to transfer the output image back to the memory. Other shared resources that may be used by the video processing device would similarly be included in the performance characteristics. These characteristics may be stored in absolute units; for example the latency and processing speed may be time per pixel, time per line or time per frame. Other characteristics may be stored in relative units, like percentages of shared resources that are used by the video processing device. These characteristics may be constants, or may vary based on factors like the number of pixels in the image or the type of operation to be performed.

For individual video processing devices that are implemented in specialized hardware, these performance characteristics generally are well defined. However, specialized hardware can have more complicated characteristics, and thus more detailed performance characteristics. For example, some specialized hardware can synchronize data movement between different processing devices such that little or no buffering is required between the devices. This synchronization means that one device can begin processing video data that has been produced by the preceding device without waiting for the preceding device to complete processing an entire video field or frame. Accurate modeling of such devices involves tracking both when a device can begin processing the first pixel of a video field or frame as well as when the device will receive the last pixel of a video field or frame. Other more simple processing devices may synchronize data movement only on complete field or frame boundaries. This type of synchronization involves tracking when the entire field or frame is available for processing, instead of the more detailed begin and end times.

For individual video processing devices that are implemented using software on a general purpose computer, or a mix of software and specialized hardware, these performance characteristics may be variable, depending on other applications that may be using the same general purpose computer, or other factors external to the device. However, simplifying assumptions can be made that allow determination of device performance characteristics despite such variability. For example, it can be assumed that each software-based video processing device signals other devices that it has completed processing data only after each field or frame, and not within a field or frame, thus avoiding the synchronization complexities mentioned above. In addition, performance characteristics may be determined by evaluating performance on a specific machine under specific conditions, given a worst-case set of input parameters in order to provide a lower bound on actual performance. Upon startup of the software, calibration code could run a test to determine the processing speed, for example. Further simplifying assumptions can be made, or more detailed characterizations can be made, to strike a balance between accuracy of characterization and speed of implementation and execution.

The selected set of device characteristics are determined and stored in the performance model for each video processing device in the system. How this performance model may be used to determine total performance characteristic of a set of video processing devices for a combination of operations will now be described. An example set of characteristics will now be used to illustrate this process, with the chosen characteristics being processing speed, latency, and bus bandwidth.

Given the combination of operations to be performed, which may be specified by a directed acyclic graph with an output node, an end-to-end latency is computed. In general, the end-to-end latency is determined in the following manner. Each video processing device has two deadlines associated with its output. The first deadline, or the start deadline, indicates the time by which the first pixel data of the image must be available. The second deadline, or the end deadline, indicates the time by which all of the pixel data of the image must be available. Using two deadlines accommodates both complex devices with intraframe synchronization as well as the simpler case of devices that only synchronize on complete field or frame boundaries. The end deadline of the output node can be set to zero, representing the time at which the final output image will be fully available. The output start deadline of the output node is set to its processing time, representing that this device must begin producing data by this time in order to finish by time 0. Thus larger time values indicate increasing latency to the final output image completion, and thus a requirement to start earlier. The device's latency is added to both the start and end output deadlines to compute the start and end input deadlines for this device. The input deadlines for the current device are passed to each of the devices that connect to the inputs of the current device. Every device obtains the start and end input deadlines computed for devices connected to its outputs, uses those deadlines as its output requirements. Each device then computes its own input start and end deadlines, which are similarly passed to each of the devices connected to its inputs. If a device in the graph has more than one output, the maximum values for the start and end deadlines of the downstream devices can be used. This constraint ensures that the device will produce its output data early enough to satisfy all devices connected to its output. This process continues through a traversal of the graph defining the combined operations until the deadline information is propagated from the output to the inputs.

Figure 2:
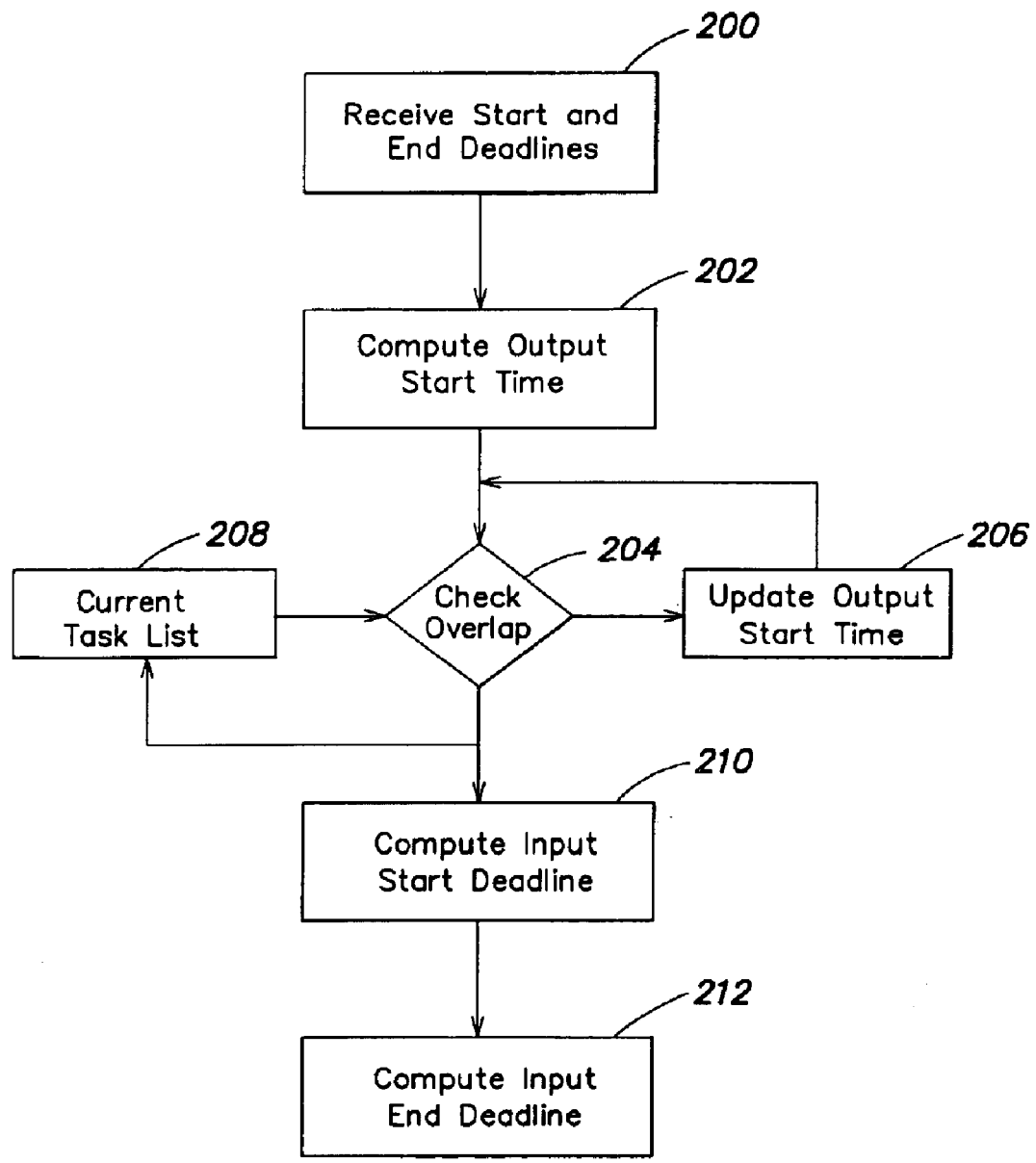
FIG. 2 is a flowchart describing how end to end latency may be computed for a particular video processing device.

In some systems, video processing devices may be implemented using a common resource. Examples of such systems include, but are not limited to, general purpose CPUs, or specialized video processing devices that can run fast enough to perform more than one task within the allotted video playback frame time. In this type of system, the graph of video processing operations may call for the use of the same physical device multiple times for different operations. Thus if a particular physical device is scheduled to perform an operation with a given set of deadlines, the schedule can be developed to account for the fact that the device may already be committed to performing other operations during the same video frame time. The device's calculation of input deadlines based on output deadlines can be performed to ensure that the new task does not collide with previously scheduled tasks. This scheduling calculation will now be described in connection with FIG. 2.

For such a device, the start and end input deadlines from the device connected to the current device's output are received (200). These values are the times by which this device must complete its processing in order to avoid stalling the device at its output. Thus these values are used as an initial set of output deadlines for this device. An adjusted output start time for the device is computed (202) by adding the processing time of the device to the received end deadline. This processing time may be a constant, or may vary depending on the size or type of data being processed. Thus the performance model for this device is provided with appropriate information to allow the model to compute processing time and latency to the desired degree of accuracy. The earlier of the original start deadline and this adjusted start time calculation is taken as the new adjusted output start deadline. Previously scheduled work (208) for this physical device is then checked (204) for overlap. If there is overlap, then the output start time is updated (206) and the current task list is checked for overlap again. After a time slot is found that both satisfies the output deadlines and does not conflict with currently scheduled work, the final output start and end deadlines are added to the current task list (208). The input start deadline is then computed (210) by adding the single-line latency to the output start time. The input end deadline is then computed (212) by subtracting the full-frame processing time from the reported input start deadline. These input start and end deadlines become the output start and end deadlines for the next node.

This calculation can be simplified if the device is simpler than the general model. For example, if field or frame-based synchronization is used, the start and end deadlines collapse to the same value, because a device cannot begin its processing until the entire field or frame is available.

For some devices, it may be sufficient to represent some shared resources as simple percentages of the total available.

For example, shared bus bandwidth utilization could be accounted for by maintaining a global total of the amount of bus bandwidth used by all devices in the system. Each device would add its required usage to the global total as it calculates its input start and end deadlines. This method of accounting is appropriate if the timing of the usage of the shared resource does not require accurate start and end times for each task's usage of the resource.

After this scheduling process and the deadline propagation have been performed on all video processing devices in the graph, several key pieces of information can be learned. In one embodiment, two of these types of information are used to determine overall performance. First, the total latency can be compared with the desired video field or frame rate. If the total latency is less than or equal to the time allotted for one video field or frame, then the graph can be determined to play in real time. If the latency exceeds the time for one video field or frame, the graph can be determined to not meet real time requirements. Second, the global usage totals for shared resources like bus bandwidth can be examined. If these totals exceed the capabilities of the shared resource in question, then the graph once again can be determined to not meet real time requirements. Only if both categories of performance characteristics can be determined to fall within the real time requirements can processing described by the graph be declared to be achievable in real time.

This scheduling process can be improved if a set of video processing devices can operate in a pipelined manner. In such a case, the requirement that the entire combination of operations be performed within a single frame time can be eliminated. In this process, two task lists are created for each device. The first task list for a device, called the latency schedule. The second task list, called the throughput schedule, is built in the same manner with the same values, except that no time is allowed to extend beyond the allotted video frame or field time limit. Instead, any time that would extend beyond that limit is wrapped around to fall back within a single frame or field time. Effectively, the throughput schedule times are calculated modulo the allotted field or frame time before being used in any collision comparisons. This modulo operation reflects the fact that even though the latency schedule may allow a task to be scheduled more than a frame time before the final output deadline, the throughput schedule schedules the task within a single frame time. If all of the tasks for a device cannot be performed in a single frame time in the throughput schedule, then the device is being asked to perform more work than it can do in real time. Both the latency and throughput schedules are calculated using the same process as in FIG. 2, but if a conflict is found in either schedule, the chosen start and end deadlines are adjusted in both schedules to avoid that conflict.

Thus, the end to end latency may be more than a frame time; however, the throughput is maintained above real time. Throughput is determined by looking at the throughput schedule for each physical device. If a device's throughput schedule requires more processing time than the time allotted for one video field or frame, then the graph can be determined to not meet real time requirements. Just as with the previous analysis, global shared resource usage totals also must fall within the capabilities of the resource, or the graph will again be determined to not meet real time requirements.

In this improved process, the two requirements described above are not sufficient to ensure that the graph will play in real time because any device graph whose total latency exceeds the allotted field or frame time may suffer a delay each time the graph topology changes. This kind of change often occurs at cut boundaries in a video editing sequence. The delay may be as long as the amount of extra latency beyond the allotted field or frame time. To make up for this potential delay, this scheduling process can take advantage of an output device that is provided with a buffer for storing several frames of data to accommodate the added latency. As the graph topology changes and a delay is encountered, the buffer provides precomputed images to continue supplying the video output device. As long as the graph changing delay is shorter than the amount of time represented by the buffered, previously computed frames, the video output device will be able to continue running without dropping any frames.

Given this buffer at the output device, the system must still provide a way to refill this buffer after it is depleted by continuing to play stored frames when the graph change is stalling the production of new frames. The ability to refill the buffer can be verified by examining the throughput schedules for each physical device. Whichever physical device has the longest total processing time will be the limiting factor, and its throughput can be used to determine the throughput for the entire graph. As long as this throughput is faster than real time, the graph of devices will gradually refill the buffer at the video output device. So long as this faster than real time playback continues for a long enough period of time before the next change in the graph, the output buffer should refill to a sufficient degree in order to sustain playback during the next graph-changing delay. Accordingly, the number of frames for which each graph is active, combined with the extent to which the graph can be processed faster than real time, can be used to determine whether the output buffer will refill for each graph change.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, such as "C++," Visual Basic, JAVA or other language, such as a scripting language or even assembly language. The computer system may also be specially programmed, special purpose hardware. In a general-purpose computer system, the processor is typically a commercially available processor, such as various processors available from Intel, AMD, Cyrix, Motorola, and IBM. The general-purpose computer also typically has an operating system, which controls the execution of other computer programs and provides scheduling, debugging, input/output control, accounting, compilation, storage assignment, data management and memory management, and communication control and related services. Example operating systems include, but are not limited to, the UNIX operating system and those available from Microsoft and Apple Computer.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for predicting performance of a set of video processing devices, comprising;
   determining, for each frame, a total performance characteristic of the set of video processing devices, including:
   accessing a model of performance characteristics of individual video processing devices in the set of video processing devices; and
   combining the performance characteristics of the individual video processing devices according to a combination of operations performed by the set of video processing devices to produce data for the frame.

2. The method of claim 1, wherein the total performance characteristic includes latency.

3. The method of claim 1, wherein the total performance characteristic includes processing time.

4. The method of claim 1, further comprising comparing the total performance characteristic to a threshold.

5. The method of claim 4, further comprising signaling whether the set of video processing devices can produce each frame in real time according to the comparison.

6. A computer program product, comprising:
   a computer readable medium;
   computer program instructions stored on the computer readable medium that, when executed by a computer, instruct the computer to perform a method for predicting performance of a set of video processing devices, comprising;
   determining, for each frame, a total performance characteristic of the set of video processing devices, including:
   accessing performance characteristics of individual video processing devices in the set of video processing devices; and
   combining the performance characteristics of the individual video processing devices according to a combination of operations performed by the set of video processing devices to produce data for the frame.

7. The computer program product of claim 6, wherein the total performance characteristic includes latency.

8. The computer program product of claim 6, wherein the total performance characteristic includes processing time.

9. The computer program product of claim 6, further comprising comparing the total performance characteristic to a threshold.

10. The computer program product of claim 9, further comprising signaling whether the set of video processing devices can produce each frame in real time according to the comparison.

* * * * *